(12) United States Patent
Watanabe et al.

(10) Patent No.: US 8,974,984 B2
(45) Date of Patent: Mar. 10, 2015

(54) POWER GENERATION SYSTEM USING AN ALKALINE FUEL CELL AND FUEL GAS FOR ALKALINE FUEL CELLS USED IN THE SYSTEM

(75) Inventors: Shin Watanabe, Ibaraki (JP); Kenji Fukuta, Ibaraki (JP); Hiroyuki Yanagi, Ibaraki (JP)

(73) Assignee: Tokuyama Corporation, Yamaguchi (JP)

( * ) Notice: Subject to any disclaimer, the term of this patent is extended or adjusted under 35 U.S.C. 154(b) by 687 days.

(21) Appl. No.: 13/387,130

(22) PCT Filed: Jul. 22, 2010

(86) PCT No.: PCT/JP2010/062304
§ 371 (c)(1),
(2), (4) Date: Jan. 26, 2012

(87) PCT Pub. No.: WO2011/013565
PCT Pub. Date: Feb. 3, 2011

(65) Prior Publication Data
US 2012/0122006 A1    May 17, 2012

(30) Foreign Application Priority Data
Jul. 30, 2009   (JP) .................................. 2009-177642

(51) Int. Cl.
*H01M 8/22*    (2006.01)
*H01M 8/08*    (2006.01)

(52) U.S. Cl.
CPC .............. *H01M 8/083* (2013.01); *H01M 8/222* (2013.01); *Y02E 60/50* (2013.01)
USPC ............................ 429/504; 429/498; 429/502

(58) Field of Classification Search
CPC .................................. H01M 8/08; H01M 8/22
USPC .......................................... 429/502, 504, 498
See application file for complete search history.

(56) References Cited

U.S. PATENT DOCUMENTS

2010/0035111 A1    2/2010  Asazawa et al.
2010/0092826 A1    4/2010  Nakanishi et al.

FOREIGN PATENT DOCUMENTS

| | | |
|---|---|---|
| JP | 2007042617 A | 2/2007 |
| JP | 2008204647 A | 9/2008 |
| JP | 2008218397 A | 9/2008 |
| JP | 2008300215 A | 12/2008 |
| JP | 2009093948 A | 4/2009 |
| WO | 2008117485 A1 | 10/2008 |

OTHER PUBLICATIONS

English abstract of JP2007042617 (A), Feb. 15, 2007.

(Continued)

*Primary Examiner* — Tracy Dove
(74) *Attorney, Agent, or Firm* — Cahn & Samuels, LLP

(57) ABSTRACT

A power generation system includes an alkaline fuel cell provided with an electrolyte membrane which is an anion exchange membrane and a pair of electrodes (an anode and a cathode) arranged on the both sides of the electrolyte membrane. The alkaline fuel cell can generate an electric power by supplying a fuel gas and an oxidizing agent gas to the anode side and the cathode side, respectively. The power generation system uses a hydrogen gas containing a basic compound such as ammonia as the fuel gas to be supplied to the anode side.

4 Claims, 1 Drawing Sheet

(56) References Cited

OTHER PUBLICATIONS

Abstract of Park, Jin-Soo, et al., "Performance of Solid Alkaline Fuel Cells Employing Anion-Exchange Membranes," Journal of Power Sources, Apr. 1, 2008, pp. 620-626, vol. 178, issue 2.
English abstract of JP2009093948 (A), Apr. 30, 2009.
English abstract of JP2008204647 (A), Sep. 4, 2008.
English abstract of JP2008300215 (A), Dec. 11, 2008.
English abstract of JP2008218397 (A), Sep. 18, 2008.
English abstract of WO2008117485 (A1), Oct. 2, 2008.

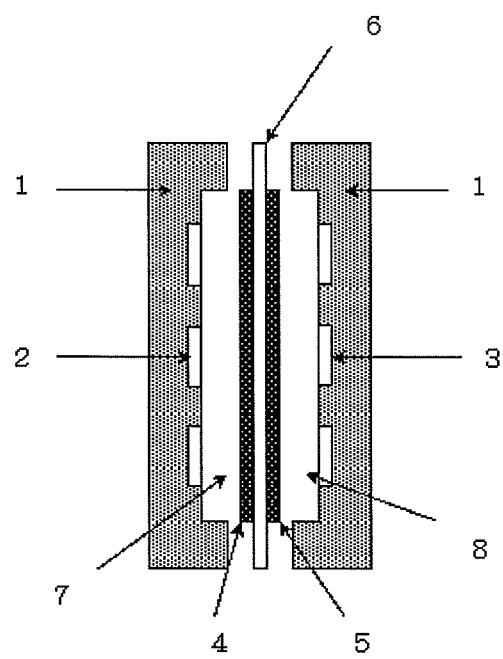

POWER GENERATION SYSTEM USING AN ALKALINE FUEL CELL AND FUEL GAS FOR ALKALINE FUEL CELLS USED IN THE SYSTEM

This application is a U.S. national stage application of PCT/JP2010/062304 filed on Jul. 22, 2010 which claims priority of Japanese patent document 2009-177642 filed on Jul. 30, 2009, the entirety of which is incorporated herein by reference.

TECHNICAL FIELD

The present invention relates to a power generation system using an alkaline fuel cell using an electrolyte membrane which is an anion-exchange membrane, and fuel gas used therein.

BACKGROUND OF THE INVENTION

A fuel cell is a power generation system to generate electrical power from chemical energy. This is classified in several types based on the operation mechanisms and materials to be used, such as alkaline-type fuel cell, phosphoric-acid fuel cell, molten carbonate fuel cell, solid-electrolyte fuel cell and solid-polymer type fuel cell, and various forms of fuel cells have been proposed and examined. Among these, the alkaline fuel cell and solid-polymer type fuel cell are expected to use as medium to small-size low-temperature operating-type fuel cells for stationary power source and in-vehicle use as well as portable power source since the operating temperature is as low as 200° C. or less.

The solid-polymer type fuel cell uses solid polymer such as ion-exchange resin as its electrolyte, and has relatively low operation temperature. The solid-polymer type fuel cell has, as shown in FIG. 1, a basic structure wherein a space surrounded by cell bulkhead 1 having a fuel flow hole 2 and oxidizing agent gas flow hole 3, respectively communicated with outside, is divided by a membrane assembly in which an anode 4 and a cathode 5 are respectively bonded to both surfaces of a solid polymer electrolyte membrane 6 to form an anode chamber 7 communicated with outside via the fuel flow hole 2 and a cathode chamber 8 communicated with outside via the oxidizing agent gas flow hole 3. Then, in the solid polymer type fuel cell having the above basic structure, hydrogen gas or liquid fuel such as methanol, etc. is supplied into the anode chamber 7 via the fuel flow hole 2, and oxygen or oxygen containing gas such as air to act as an oxidizing agent is supplied into the cathode chamber 8 via the oxidizing agent gas flow hole 3. Furthermore, an external load circuit is connected between both electrodes to generate electrical energy by the following mechanism.

When using a cation-exchange membrane as the solid polymer electrolyte membrane 6, a proton (hydrogen ion) generated by contacting a fuel with a catalyst included in the anode 4 conducts in the solid polymer electrolyte membrane 6 and moves into the cathode chamber 8 to generate water by reacting with oxygen in the oxidizing agent gas in the cathode 5. On the other hand, an electron, generated in the anode 4 simultaneously with the proton, moves to the cathode 5 through the external load circuit, so that it is possible to use the energy from the above reaction as an electrical energy.

In the solid-polymer type fuel cell wherein the cation-exchange membrane is used for a solid electrolyte membrane, only an expensive noble metal catalyst is usable as the catalyst in the electrode due to the strongly acidic reaction field.

Then, it has been examined to use an anion-exchange membrane instead of the cation-exchange membrane. In a fuel cell using the anion-exchange membrane, a catalyst other than noble metal can be used because the reaction field is basic. However, in this case, a mechanism for generating electrical energy in the solid-polymer type fuel cell is different in ion species moving in the solid polymer electrolyte membrane 6 as below. Namely, hydrogen or methanol, etc. is supplied into the anode chamber, and oxygen and water are supplied into the cathode chamber, so that the catalyst included in the electrode is contacted with the oxygen and water in the cathode 5 to generate hydroxy-ion. This hydroxy-ion conducts in the solid polymer electrolyte membrane 6 formed by the above anion-exchange membrane to move into the anode chamber 7 and reacts with the fuel in the anode 4 to generate water. An electron generated as a result of the reaction in the anode 4 moves to the cathode 5 through an external load circuit, so that the reaction energy is used as an electrical energy.

The above fuel cell with a mechanism in which hydroxy-ion moves in the membrane is called as an alkaline fuel cell. Therefore, the solid-polymer type fuel cell using an anion-exchange membrane as a solid-polymer type fuel cell electrolyte membrane can also be classified into alkaline fuel cells.

In the alkaline fuel cells, atmospheres of both electrodes are basic, and choices for available catalyst types are increased, which results in the following advantages. For example, overvoltage of oxygen reduction can be reduced, and furthermore, it is expected as well to improve voltage by selecting a cathode catalyst inactive to the fuel passing through the membrane.

In an example of the alkaline fuel cells using anion-exchange membrane, hydrogen is supplied to the anode side, and oxygen or air is supplied to the cathode side to generate electricity (Patent Article 1 & Nonpatent Literature 1).
[Patent Article 1] Japanese Unexamined Patent Publication No. 2007-042617
[Nonpatent Literature 1] Journal of Power Sources 2008, vol. 178, p. 620

In an alkaline fuel cell using an electrolyte membrane which is an anion-exchange membrane, hydrogen gas is advantageous as its fuel gas because it is easy to obtain high output when a highly-diffusible and highly-active catalyst is usable. However, while the alkaline fuel cell using an anion-exchange membrane as an electrolyte membrane has various advantages over those using a cation-exchange membrane as mentioned above, its actual output is not as high as expected even when using the hydrogen gas.

The purpose of the present invention is to develop a method to obtain higher output than before in alkaline fuel cells using an electrolyte membrane which is an anion-exchange membrane.

SUMMARY OF THE INVENTION

The present inventors have variously examined to attain high output in alkaline fuel cells. As a result, it was found that high output is available to inhibit voltage loss in the anode. As its concrete measure, the inventors found that output can be improved by supplying hydrogen containing a basic compound as a fuel at the side of the anode, and achieved the present invention.

Namely, according to the present invention, there is provided a power generation system or a method for generating electricity using an alkaline fuel cell provided with an electrolyte membrane which is an anion-exchange membrane, and an anode and a cathode as a pair of electrodes arranged at both sides of the membrane, the fuel cell generating electricity by supplying fuel gas to a side of the anode and supplying oxidizing agent gas to a side of the cathode, respectively, wherein: hydrogen gas containing a basic compound is used as the fuel gas supplied to the side of the anode.

Also, the disclosed is the above power generation system or method for generating electricity, wherein the basic compound is ammonia.

The further disclosed is the above power generation system or method for generating electricity, wherein a content of the basic compound is 0.1 to 10 mol/m$^3$ in the hydrogen gas containing the basic compound.

The further disclosed is the above power generation system or method for generating electricity, wherein the oxidizing agent gas is atmosphere.

The further disclosed is fuel gas for an alkaline fuel cell using an anion-exchange membrane as an electrolyte membrane, which is hydrogen gas containing a basic compound.

According to the power generation system or method for generating electricity using the alkaline fuel cell of the present invention, higher output can be obtained than the conventionally-used fuel cell using hydrogen gas as fuel gas. Therefore, it is highly useful for practical use of alkaline fuel cells having the above-described various advantages.

It is not fully understood why such a high output can be obtained in the system of the present invention, but the present inventors presume as follows. Namely, the anode and cathode in the alkaline fuel cell include an electrode catalyst and anion conductive ionomer as mentioned below. In addition, voids are formed between particles in the electrodes when the electrode catalyst is supported by particles of conductive agent. The above anion conductive ionomer can be hydrated in the anode, and the voids between particles also absorb water because water is generated in electrode reaction at the anode. Consequently, the basic compound can be dissolved in the contained water in the anode when the hydrogen gas as fuel contains the basic compound to increase hydroxy-ion concentration and to improve ion conductivity. As a result, ohm loss at the anode and anode reaction overvoltage can be lowered to obtain high output.

BRIEF DESCRIPTION OF THE DRAWINGS

FIG. 1 is a conceptual diagram showing a basic structure of a solid polymer type fuel cell.

EXPLANATION OF SYMBOLS

1: cell bulkhead
2: fuel flow hole
3: oxidizing gas flow hole
4: anode
5: cathode
6: solid polymer electrolyte (anion-exchange membrane)
7: anode chamber
8: cathode chamber

DETAILED DESCRIPTION OF THE INVENTION

In a power generation system using an alkaline fuel cell of the present invention, an alkaline fuel cell is provided with an electrolyte membrane which is an anion-exchange membrane, and an anode and a cathode as a pair of electrodes arranged at both sides of the membrane, in which fuel gas is supplied to a side of the anode while oxidizing agent gas is supplied to a side of the cathode, respectively to generate electricity, wherein: hydrogen gas containing a basic compound is used as the fuel gas. For the basic compound, any compound can unlimitedly be used, which can be mixed with the hydrogen gas, remain in a gaseous state when supplied to the anode of the fuel cell, and is basic when dissolved in water. For obtaining higher output, it is preferable that water solubility is high, and acid dissociation constant (pKa) as an index for basicity is preferably 8 or more, more preferably 9 to 12 and further preferably 9 to 11. When the acid dissociation constant is too large, an anion conductive ionomer included in the anode and the anion-exchange membrane, etc., may be deteriorated.

Specific examples of the basic compounds usable in the present invention may include ammonia, alkylamines such as methylamine, dimethylamine, trimethylamine, ethylamine, diethylamine, triethylamine, diethylmethylamine, propylamine, dipropylamine, tripropylamine, isopropylamine, diisopropylamine, triisopropylamine, butylamine, dibutylamine and tributylamine, aniline, pyridine, etc. Among these, ammonia, methylamine, dimethylamine and trimethylamine are preferable because they are easily in the gaseous state at ambient temperatures (25° C.), and furthermore, ammonia is most preferable because of its high water solubility.

Concentration of the basic compound in the hydrogen gas is not particularly limited, but the effect to improve output of the alkaline fuel cell may be small when the concentration is low. Also, when the concentration of the basic compound in the hydrogen is too high, the concentration of the hydrogen gas as fuel may be lowered relatively, causing increased anode potential or the insufficient supply of the hydrogen gas to the anode. Consequently, the concentration of the basic compound in the hydrogen gas is preferably 0.1 to 10 mol/m$^3$, more preferably 0.2 to 8 mol/m$^3$.

Note that the basic compound is known to be adsorbed onto the catalyst of the anode to lower the activity. Therefore, relatively high concentration of the basic compound in the hydrogen gas may cause, in addition to the above reason, reduction effect of the catalyst activity by the basic compound. This reduction effect of the catalyst activity may influence in high concentration range even within the above-mentioned preferable range of the basic compound. Therefore, for inhibiting the reduction of the catalyst activity and maximizing the effect of improving ion conductivity due to the basic compound, especially for obtaining high output, the above concentration of the basic compound in the hydrogen gas is most preferably 0.4 to 4 mol/m$^3$.

A method for obtaining hydrogen gas containing the basic compound is not particularly limited, and any known method can be used. The following is a specific example. Namely, there may be mentioned a method for obtaining hydrogen gas containing the basic compound by passing hydrogen gas through the basic compound or basic compound solution, a method for obtaining hydrogen gas containing the basic compound by spraying the basic compound or basic compound solution in hydrogen gas, etc. The basic compound may be used directly when it is gas at temperature for supplying the hydrogen gas containing the basic compound, or this may be used as a mixed gas with inactive gas such as nitrogen and argon to mix with the hydrogen gas in a gaseous state. Thus-obtained hydrogen gas containing the basic compound can be used as fuel gas for an alkaline fuel cell using an anion-exchange membrane as an electrolyte membrane.

Supplied amount of the hydrogen gas containing the basic compound to the anode is not particularly limited, and it is preferable to use the doubled value or more, which is obtained by calculating fuel amount based on an area of the anion-exchange membrane and current density at generating electricity, followed by doubling the calculated value. Normally, the supplied amount can be selected from the range of 5 to 100 ml/min per 1 cm² of the anion-exchange membrane.

Except for supplying the above-mentioned hydrogen gas containing the basic compound as fuel gas, any operating condition and constitution of conventionally known alkaline fuel cells using anion-exchange membrane as its electrolyte membrane can unlimitedly used for the power generation system of the present invention.

Namely, oxygen or air is supplied to the cathode as the oxidation agent in this system, and relative humidity of the air is preferably 30 to 100% RH, more preferably 50 to 100% RH. When this is less than 30% RH, the anion-exchange membrane may be dried to increase resistance to lower the output. When the atmospheric humidity is within the above range in operating environment of the fuel cell, the air may be supplied without controlling the humidity, and also with humidifying by a humidifier.

Also, it is practically preferable to directly supply the atmosphere as the oxidation agent only with the above humidity control if necessary because special refining equipment and storing equipment such as bomb are not required.

It is known that carbon dioxide in air affects electricity generating performance in an alkaline fuel cell. Normally, the atmosphere contains carbon dioxide at a concentration of 380 ppm or so. The anion-exchange membrane used as the electrolyte membrane of the alkaline fuel cell of the present embodiment may absorb carbon dioxide in the atmosphere by being exposed to the atmosphere, etc., before using as a fuel cell, so that its counter ion $OH^-$ is rapidly substituted with $CO_3^{2-}$ followed by further changing the $CO_3^{2-}$ to $HCO_3^-$ even if the counter ion of an anion-exchange group is preliminarily ion-exchanged into $OH^-$. The anion-exchange membrane in which the counter ion is changed to $CO_3^{2-}$ or $HCO_3^-$ is lower in its ion-conductivity compared to an anion-exchange membrane in which all counter ions are $OH^-$, and is also low in concentration of $OH^-$ as its electrode reaction species and low in basicity of the electrode reaction field. Consequently, reaction overpotential is larger compared to the anion-exchange membrane in which all counter ions are $OH^-$, resulting in lower output compared to a fuel cell using the anion-exchange membrane in which all counter ions are $OH^-$.

The effect of the present invention due to a basic compound included in hydrogen gas is more remarkable when using the atmosphere as oxidizing agent gas only with controlling humidity if needed as described above, than when using air with reduced carbon dioxide concentration as oxidizing agent gas. Namely, output difference due to existence or nonexistence of the basic compound in hydrogen gas may be larger when directly using the atmosphere. The reason is not fully understood, but can be presumed as follows.

As mentioned above, the anion-exchange membrane of the alkaline fuel cell is a $HCO_3^-$-type by absorbing carbon dioxide in the atmosphere before generating electricity, and the $HCO_3^-$ and others are further substituted with $OH^-$ generated in the cathode at generating electricity and released as carbon dioxide from the anode. However, when using air containing carbon dioxide as oxidizing agent gas, all counter ions do not become $OH^-$ because carbon dioxide is always absorbed from the cathode. That is, ion-conductivity of the anion-exchange membrane is lowered because of the remaining $CO_3^{2-}$ or $HCO_3^-$, and basicity around the anode catalyst is lowered. When using air with reduced carbon dioxide, ion-conductivity and basicity are not lowered. When hydrogen gas contains the basic compound, $CO_3^{2-}$ or $HCO_3^-$ around the electrode catalyst is neutralized in the anion-exchange membrane and anode by the basic compound to further increase basicity around the region, so that output is high even when the oxidizing agent gas contains carbon dioxide.

Supplied amount of the oxidizing agent gas to the cathode is not particularly limited, and it is preferable to use the doubled value or more, which is obtained by calculating the amount used of the oxidizing agent gas based on an area of the anion-exchange membrane and current density at generating electricity followed by doubling the calculated value. Normally, the supplied amount can be selected from the range of 10 to 200 ml/min per 1 cm² of the anion-exchange membrane.

Operating temperature of the alkaline fuel cell in the power generation system of the present invention is normally −30° C. to 120° C., and preferably 20° C. to 90° C. in view of high output and durability of materials used. The fuel gas and oxidizing agent gas may preferably be made in the above temperature range and then supplied.

The alkaline fuel cell used in the system of the present invention is provided with an anion-exchange membrane as an electrolyte membrane, and an anode and a cathode as a pair of electrodes arranged at both sides of the membrane (hereinafter this structure may be referred to as "anion-exchange membrane-electrode assembly"). A variety of materials used for the above anion-exchange membrane-electrode assembly and a production method of the membrane assembly are not limited, and materials and production methods used in any conventional polymer electrolyte type fuel cell can unlimitedly be used.

For example, for the anion-exchange membrane, any anion-exchange membrane known to be used as a solid polymer electrolyte membrane for a polymer electrolyte type fuel cell can unlimitedly be used. Among these, it is preferable to use hydrocarbon-based membrane for the above anion-exchange membrane since this can inhibit permeability of the hydrogen gas which is fuel and inexpensively be produced, etc. The anion-exchange membrane containing hydrocarbon-based anion-exchange resin may be, for example, an anion-exchange membrane obtained by casting to form film of hydrocarbon-based anion-exchange resin in which a variety of functional groups is introduced into engineering plastic materials typified by polysulfone, polyether ketone, polyether ether ketone and polybenzimidazole-based polymer, etc., if needed.

Preferable hydrocarbon-based anion-exchange membrane is an anion-exchange membrane having a porous membrane as its base material, wherein void portion of the porous membrane is filled with a cross-linked hydrocarbon-based anion-exchange resin. In such an anion-exchange membrane in which the cross-linked hydrocarbon-based anion-exchange resin is ununiformly dispersed in the porous membrane, the porous membrane works as a reinforcing portion, so that physical strength of the anion-exchange membrane can be increased without sacrificing electric resistance as well as improved chemical durability. As the anion-exchange membrane, for example, a membrane as disclosed in the Japanese Unexamined Patent Publication 2007-42617 may be mentioned, in which void of porous membrane is impregnated with a polymerizable monomer composition formed by, for example, chloromethylstyrene and divinylbenzene, 4-vinylpyridine and divinylbenzene, etc., followed by heat polymerization of the polymerizable composition and further treatment such as amination and alkylation for introducing a desired anion-exchange group.

For the above-mentioned porous membrane, generally, thermoplastic resin woven fabric, nonwoven fabric, porous film and the like can be used, and it is preferable to use porous film made of thermoplastic resin including polyolefin resin such as polyethylene, polypropylene and polymethylpentene, fluorine-based resin such as polytetrafluoroethylene, poly (tetrafluoroethylene-hexafluoropropylene) and polyvinylidene fluoride, etc. because gas permeability is low and the membrane can be made thinner.

As an anion-exchange group in the anion-exchange membrane, there may be mentioned primary to tertiary amino group, quaternary ammonium base, pyridyl group, imidazole group, quaternary pyridinium base, quaternary imidazolium base, etc. The quaternary ammonium base which is a strongly basic group is preferable because of excellent anion-conductivity.

The anion-exchange membrane used for the electrolyte membrane in the present invention may have any counter ion, and is normally produced to have the halogen type counter ion. In the anion-exchange membrane having halogen type counter ion, ion-conductivity is low and high output is hardly obtained. Therefore, it is preferable that the counter ion is ion-exchanged to $OH^-$ type in such a counter ion type because of increased ion-conductivity of the membrane, increased concentration of $OH^-$ as electrode reaction species and ease to increase basicity in the electrode reaction field. The ion-exchange to $OH^-$ type can be done by a conventionally known method, i.e. by immersing the anion-exchange membrane in an alkaline solution such as aqueous sodium hydroxide and aqueous potassium hydroxide. Normally, the ion-exchange is done by immersing for 0.5 to 10 hours at alkali concentration of 0.01 to 5 mol/L. It is also effective to repeat ion-exchange procedures several times. Also, normally, the ion-exchanged anion-exchange membrane can be used after optional steps such as water washing and drying.

Also, the counter ion of the above-mentioned anion-exchange membrane may preferably be $HCO_3$, $CO_3^{2-}$, or mixture thereof. These counter ion types allow the anion-exchange membrane having stable properties regardless of the level of absorbing carbon dioxide in the atmosphere and also improving stability of the anion-exchange group such as quaternary ammonium base. The ion-exchange to these counter ions can be done by immersing the anion-exchange membrane in aqueous solution of sodium carbonate or sodium hydrogen carbonate, etc., for example, as in the ion-exchange to $OH^-$ type.

The anion-exchange membrane used for the electrolyte membrane in the present invention has anion-exchange capacity of normally 0.2 to 3 $mmol \cdot g^{-1}$, preferably 0.5 to 2.5 $mmol \cdot g^{-1}$, and is preferably prepared to have water content at 25° C. of 7 mass % or more, preferably 10 to 90 mass %, so as to hardly reduce anion conductivity due to drying. Also, the membrane thickness is normally preferably 5 to 200 μm, more preferably 10 to 100 μm, in view of achieving low electric resistance and providing mechanical strength required as a support membrane. Due to the above properties, the anion-exchange membrane for the electrolyte of the present invention exhibits membrane resistance at 25° C. in 0.5 mol/L-sodium chloride of normally 0.05 to 1.5 $O \cdot cm^2$, preferably 0.1 to 0.5 $O \cdot cm^2$.

For the anode and cathode constituting the anion-exchange membrane-electrode assembly, conventionally known catalyst electrode layer used in a solid polymer electrolyte type fuel cell can unlimitedly be used, which includes electrode catalyst and anion conductive ionomer. A specific method for forming the anode and cathode to the anion-exchange membrane may be as follows: (I) a method in which a paste composition is obtained by adding binding agent, dispersion medium and the like as appropriate to the electrode catalyst, and is then subject to directly forming by roll or coating on a support layer material such as carbon paper followed by heat treatment to obtain a laminate, a solution of the anion conductive ionomer is coated for impregnation on the surface to be bonded with the anion-exchange membrane followed by drying if needed, and this is then subject to thermal compression bond with the anion-exchange membrane; or (II) a method in which a paste composition is obtained by adding the anion conductive ionomer and if needed, binding agent, dispersion medium and the like to the electrode catalyst, and is coated on a support layer material such as carbon paper or is coated on a peeling film to transfer onto the anion-exchange membrane or is directly coated on the anion-exchange membrane, followed by drying, which is then subject to thermal compression bond with the anion-exchange membrane if needed; etc. The above-mentioned method (II) is more preferable in view of increasing usage rate of the electrode catalyst in the catalyst electrode layer.

As the above anion conductive ionomer, any conventionally known materials can unlimitedly be used if the materials have an anion-exchange group in its molecule and show anion conductivity. The water content at 25° C. is 5 mass % or more, preferably 10 to 200 mass %, in view of fully providing the effect of the present invention by dissolving the basic compound.

For example, there may be mentioned resin having halogenoalkyl group such as chloromethyl group, chloroethyl group, chloropropyl group, chlorobutyl group, chloropentyl group, chlorohexyl group, bromomethyl group, bromoethyl group, bromopropyl group, bromobutyl group, bromopentyl group, bromohexyl group, iodomethyl group, iodoethyl group and iodobutyl group. The specific examples include resin obtained by amination of, for example, polychloromethylstyrene, poly(styrene-chloromethylstyrene) copolymer, polybromoethylstyrene, bromobutyl styrene, chloromethylated polysulfone, chloromethylated polyphenylene oxide and chloromethylated polyether ether ketone, to introduce a corresponding anion-exchange group, etc.

Alternatively, it is also possible to use resin obtained by reacting an alkylating agent such as methyl iodide with poly-(4-vinylpyridine), poly-(2-vinylpyridine), poly-vinylimidazole, poly-benzimidazole and the like, and introducing a corresponding anion-exchange group.

Particularly, for each catalyst electrode layers to be the anode and cathode, a hydrocarbon-based polymeric elastomer having an anion-exchange group in its molecule and being poorly-soluble in water and methanol, as disclosed in Japanese Unexamined Patent Publication No. 2002-367626, is preferably used because of joining property with the above-mentioned anion-exchange membrane and solvent resistance to liquid fuel as well as the above-mentioned operability during catalyst electrode layer production.

The electrode catalyst of the catalyst electrode layer is not particularly limited, and any publicly-known catalyst can be used. Namely, metal particles facilitating oxidation reaction of the hydrogen and reduction reaction of the oxygen, such as platinum, gold, silver, palladium, iridium, rhodium, ruthenium, tin, iron, cobalt, nickel, molybdenum, tungsten, vanadium, or alloys thereof, etc. can unlimitedly be used, and it is preferable to use platinum metal catalyst because catalyst activity is excellent.

Also, the use of the anion-exchange membrane allows using a variety of metallic oxides, unavailable for conventional strongly-acidic cation-exchange membranes, as the electrode catalyst. For example, perovskite-type oxides expressed in $ABO_3$ which are excellent in oxidative activity can preferably be used. Specific examples include $LaMnO_3$, $LaFeO_3$, $LaCrO_3$, $LaCoO_3$ and $LaNiO_3$, or it is also preferable to use as the electrode catalyst such as partially-substituted perovskite-type oxide in which a part of the above "A" site is substituted with Sr, Ca, Ba, Ce, Ag, and the like as well as those in which a part of the above "B" site is substituted with Pd, Pt, Ru, Ag and the like.

Note that particle diameter of the electrode catalyst is normally 0.1 to 100 nm, more preferably 0.5 to 10 nm. When the particle diameter is smaller, catalyst performance may be increased, but those with a particle diameter of less than 0.5 nm are hardly produced. When the diameter is more than 100 nm, sufficient catalyst performance is hardly obtainable. Note that the catalyst may be used after being preliminarily supported by a conductive agent. The conductive agent is not particularly limited as far as this is an electron conductive material, and for example, carbon black such as furnace black and acetylene black, active carbon, graphite and the like are generally used independently or in a mixture.

A content of the electrode catalyst is normally 0.01 to 10 mg/cm$^2$, more preferably 0.1 to 5.0 mg/cm$^2$, in terms of an electrode catalyst mass per unit area of the sheet-like catalyst electrode layers to be the anode and the cathode.

Also, the catalyst electrode layers to be the anode and the cathode can be added with a binding agent if needed. As the binding agent, a variety of thermoplastic resins can generally be used, and preferably usable thermoplastic resins may include polytetrafluoroethylene, polyvinylidene fluoride, tetrafluoroethylene-perfluoroalkyl vinyl ether copolymer, polyether ether ketone, polyethersulfone, styrene-butadiene copolymer, acrylonitrile-butadiene copolymer, etc. A content of the binding agent is preferably 5 to 25 wt % of the above catalyst electrode layer. Also, the binding agent may be used independently or in a combination of 2 or more.

Also, as the support layer material used for the catalyst electrode layer if needed, porous carbon materials such as carbon fiber woven fabric and carbon paper are normally used. Thickness of the support layer material is preferably 50 to 300 μm, and its porosity is preferably 50 to 90%. Normally, the catalyst electrode layer can be obtained by filling the voids of the support layer material with the paste composition containing the above-mentioned electrode catalyst and adhering the paste composition to the surface of the support layer material such that the obtained catalyst electrode layer has a thickness of 5 to 50 μm.

Also, in the above-mentioned methods (I) and (II) for forming the anode and cathode, the amount used of the above-mentioned anion conductive ionomer is not particularly limited, and it is preferable in the above method (I) to use the anion conductive ionomer having a content of 5 to 60 mass %, particularly 10 to 40 mass %, with respect to the catalyst electrode layer in the range of 1 to 50% of the entire thickness from the bonded surface, in view of the effect of giving ion-conductivity. Also in the above method (II), the content of the anion conductive ionomer is preferably 5 to 60 mass %, particularly preferably 10 to 40 mass %, per total mass of the catalyst electrode layer.

Furthermore, in the case of the thermal compression bond of the anode and cathode with the anion-exchange membrane in the above-mentioned methods (I) and (II), the thermal compression bond can be done by a device able to pressurize and heat, such as hot press and roll press generally. Pressing temperature is generally 80° C. to 200° C. Pressing pressure depends on the thickness and hardness of the catalyst electrode layers, and is normally 0.5 to 20 MPa.

Thus-produced anion-exchange membrane-electrode assembly is used by being mounted in a solid electrolyte fuel cell having the basic structure as shown in the above-mentioned FIG. 1.

EXAMPLES

Hereinafter, the present invention will be explained further in detail by using examples, but the present invention is not limited to these examples. Note that operating characteristics of fuel cells in Examples and Comparative Examples are as follows.

1) Measurements of Concentration of Basic Compound in Hydrogen Gas Fuel

Hydrogen gas containing a basic compound was passed through 100 ml of 10 mM-sulfuric acid aqueous solution (absorbing liquid), which was continued until the volume of the passing hydrogen gas became 1 L (at 25° C.). The concentration of the basic compound in the absorbing liquid was separated and analyzed by ion chromatography. The concentration of the basic compound was calculated by using the following formula and the peak area of chromatographic peak obtained when measuring the known concentration (in mol/L) of the basic compound aqueous solution (so-called standard concentration solution).

Amount of the basic compound in the absorbing liquid (mol)=$A soln/Astd \times Cstd \times Vsoln$ where each symbol indicates as follows:
Asoln: area of chromatographic peak when measuring the absorbing liquid,
Astd: area of chromatographic peak when measuring the standard concentration solution,
Cstd: concentration of the above standard concentration solution (mol/L)
Vsoln: volume of the absorbing liquid (L)

Concentration of the basic compound in the hydrogen gas (mol/m$^3$)=[basic compound amount in absorbing liquid (mol)]/0.001 (m$^3$)

Measuring conditions were as follows.
measuring apparatus: DIONEX K.K. ICS-2000
separation column: IONPAC CS-14
measurement sample volume: 25 μl
detector: conductivity detector
eluent composition: 25 mM methanesulfonic acid/acetonitrile (9/1) mixed solution
eluent flow rate: 1 ml/min 2) Evaluation of Alkaline Fuel Cell
(Preparation of Anion-Exchange Membrane)

A polyethylene porous membrane (with the membrane thickness of 25 μm, average pore diameter of 0.03 μm and porosity of 37%) was impregnated with a polymerizable monomer composition including 97 mass parts of chloromethylstyrene, 3 mass parts of divinylbenzene, 5 mass parts of ethylene glycol diglycidylether and 5 mass parts of t-butyl peroxy ethylhexanoate, and both sides of the porous membrane were covered with 100 μm of polyester film as a separating material, followed by heat polymerization under applying pressure with 0.3 MPa of nitrogen at 80° C. for 5 hours. The obtained membrane-shaped material was immersed in an aqueous solution containing 6 mass % of trimethylamine and 25 mass % of acetone at room temperature for 16 hours, so that an anion-exchange membrane for a fuel cell having a quaternary ammonium base as an anion-exchange group was obtained.

The obtained anion-exchange membrane had an anion-exchange capacity of 1.8 mmol/g, a water content at 25° C. of 25 mass % and the dried membrane thickness of 28 μm.

The anion-exchange membrane was impregnated with 0.5 mol/L of aqueous sodium hydroxide solution to ion-exchange the counter ion of the anion-exchange group to OH$^-$.

Then, after being left in the atmosphere for 12 hours or more, the membrane was used for fuel cell output evaluation.

(Preparation of Anion-Exchange Membrane-Catalyst Electrode Assembly)

{Polystyrene-poly(ethylene-butylene)-polystyrene}triblock copolymer (made by Asahi Kasei Chemicals Corporation, "H1031 Tuftec") was chloromethylated, and immersed in an aqueous solution containing 6 mass % of trimethylamine and 25 mass % of acetone at room temperature for 16 hours, followed by further immersing in 0.5 mol/L-NaOH aqueous solution for 10 hours or more to obtain an anion conductive ionomer for catalyst electrode layer ($OH^-$-type). The ionomer had a weight average molecular weight of 30000, anion-exchange capacity of 1.5 mmol/g-dry resin, and a water content at 25° C. of 120 mass %.

The anion conductive ionomer was dissolved in 1-propanol in an autoclave at 130° C. for 3 hours, and ionomer solution with a concentration of 5 mass % was obtained.

Then, the above ionomer solution was mixed with carbon black supporting 50 mass % of platinum catalyst with an average particle diameter of 2 nm to prepare a composition for forming the catalyst electrode layer. Next, the composition was printed on one side of the anion-exchange membrane, and dried in the atmosphere at 25° C. for 12 hours or more to form an anode. Furthermore, a cathode was formed on the other side of the anion-exchange membrane as with the above to obtain an anion-exchange membrane-catalyst electrode assembly. It was controlled that both anode surface and cathode surface had platinum amounts of 0.4 mg/cm$^2$, and contents of the ionomer in both catalyst electrode layers were 30 mass %. Also, each area of the catalyst electrode layers was 5 cm$^2$.

(Fuel Cell Output Test)

Water-repellent polytetrafluoroethylene carbon cloth with a thickness of 300 μm (EC-CC1-060T made by ElectroChem, Inc.) was stacked on both sides of the obtained anion-exchange membrane-catalyst electrode assembly, and this was set in a fuel cell shown in FIG. 1. Then, temperature of the fuel cell was set at 50° C., hydrogen passing through aqueous solution of the basic compound heated at 50° C. was supplied into an anode chamber at 50 ml/min, and air humidified in 95% RH at 50° C. was supplied from a bomb to a cathode chamber at 200 ml/min to perform an electricity generation test. The concentration of the basic compound in the hydrogen gas was controlled by the concentration of the aqueous solution of the basic compound. The concentration of the basic compound in the gas was separately measured by the above method. After generating electricity at cell voltage of 0.2 V for 2 hours, cell voltage (open circuit voltage) at current density of 0 A/cm$^2$ and cell voltage at 0.2 A/cm$^2$ were measured and the output was evaluated.

Examples 1 to 9

Hydrogen gases containing a variety of concentrations of the basic compound were supplied to the anode for performing the output test. For the oxidizing agent gas, air containing 380 ppm of carbon dioxide was used. The results are shown in Table 1. Also, the concentration of the included basic compound to the hydrogen was measured. The results are also shown in Table 1.

Comparative Example 1

Except for using hydrogen gas containing no basic compound, output test was performed as in Example 1. The results of the output test are shown in Table 1.

Using the hydrogen gas containing the basic compound, the cell voltage was increased, and the output was improved.

Examples 10 to 15

Except for using air containing no carbon dioxide as the oxidizing agent gas, output test was performed as in Example 1. The results are shown in Table 2.

Comparative Example 2

Except for using hydrogen gas containing no basic compound, output test was performed as in Example 10. The results are shown in Table 2.

When using air containing no carbon dioxide, the cell voltage was high in the sample using hydrogen containing no basic compound compared to Examples 1 to 9 using the hydrogen containing 380 ppm of carbon dioxide. However, when using hydrogen gas containing the basic compound, it was shown that the cell voltage was further increased and that the output was improved as shown in Examples 10 to 15.

TABLE 1

| | Basic compound | Concentration of basic compound (mol/m$^3$) | Existence of carbon dioxide in oxidizing agent gas (air) | Cell voltage (V) 0 A/cm$^2$ | 0.2 A/cm$^2$ |
|---|---|---|---|---|---|
| Example 1 | ammonia | 3 | Yes | 0.94 | 0.37 |
| Example 2 | ammonia | 0.2 | Yes | 1.01 | 0.31 |
| Example 3 | ammonia | 1 | Yes | 0.98 | 0.35 |
| Example 4 | ammonia | 2 | Yes | 0.96 | 0.35 |
| Example 5 | ammonia | 4 | Yes | 0.92 | 0.36 |
| Example 6 | ammonia | 9 | Yes | 0.90 | 0.23 |
| Example 7 | trimethylamine | 4 | Yes | 0.96 | 0.35 |
| Example 8 | trimethylamine | 9 | Yes | 0.94 | 0.27 |
| Example 9 | diethylamine | 8 | Yes | 0.95 | 0.33 |
| Comparative Example 1 | — | — | Yes | 1.03 | 0.21 |

TABLE 2

| | Basic compound | Concentration of basic compound (mol/m$^3$) | Existence of carbon dioxide in oxidizing agent gas (air) | Cell voltage (V) 0 A/cm$^2$ | 0.2 A/cm$^2$ |
|---|---|---|---|---|---|
| Example 10 | ammonia | 3 | No | 1.02 | 0.45 |
| Example 11 | ammonia | 0.2 | No | 1.03 | 0.37 |
| Example 12 | ammonia | 1 | No | 1.03 | 0.40 |
| Example 13 | ammonia | 2 | No | 1.02 | 0.40 |
| Example 14 | ammonia | 4 | No | 1.01 | 0.41 |
| Example 15 | triethylamine | 8 | No | 1.01 | 0.36 |
| Comparative Example 2 | — | — | No | 1.02 | 0.34 |

The invention claimed is:

1. A power generation system using an alkaline fuel cell, provided with an electrolyte membrane which is an anion-exchange membrane, and an anode and a cathode as a pair of electrodes arranged on both sides of the membrane, the fuel cell generating electricity by supplying fuel gas to a side of the anode and oxidizing agent gas to a side of the cathode, wherein the fuel gas supplied to the side of the anode is hydrogen gas containing a basic compound;

said basic compound is in the gaseous state at ambient temperatures;

in said hydrogen gas containing the basic compound, a content of said basic compound is 0.1 to 10 mol/m$^3$; and said oxidizing agent gas is atmosphere.

2. The power generation system as set forth in claim 1, wherein said basic compound comprises ammonia.

3. A method of operating a power generation system, comprising:

supplying fuel gas supplied to a side of an anode in an alkaline fuel cell, said fuel gas comprising hydrogen gas and 0.1 to 10 mol/m$^3$ of a basic compound, wherein said basic compound is in a gaseous state at ambient temperatures;

supplying an oxidizing agent gas comprising atmosphere to a side of a cathode in the alkaline fuel cell; and generating electricity, wherein the alkaline fuel cell comprises an anion-exchange membrane, with the anode and the cathode arranged on both sides of the membrane.

4. A method as set forth in claim 3, wherein said basic compound comprises ammonia.

* * * * *